United States Patent

Thomas et al.

(10) Patent No.: US 9,852,052 B2
(45) Date of Patent: Dec. 26, 2017

(54) TRUSTED EXECUTION OF CALLED FUNCTION

(71) Applicant: Intel Corporation, Santa Clara, CA (US)

(72) Inventors: Ramesh Thomas, Saratoga, CA (US); Manohar R. Castelino, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/087,647

(22) Filed: Mar. 31, 2016

(65) Prior Publication Data

US 2017/0286278 A1 Oct. 5, 2017

(51) Int. Cl.
G06F 9/44 (2006.01)
G06F 11/36 (2006.01)
G06F 21/52 (2013.01)

(52) U.S. Cl.
CPC ............ *G06F 11/3688* (2013.01); *G06F 8/70* (2013.01); *G06F 21/52* (2013.01); *G06F 2221/033* (2013.01)

(58) Field of Classification Search
None
See application file for complete search history.

(56) References Cited

U.S. PATENT DOCUMENTS

| 6,412,071 | B1 | 6/2002 | Hollander et al. | |
|---|---|---|---|---|
| 7,546,587 | B2 * | 6/2009 | Marr | G06F 21/10 717/124 |
| 2006/0259818 | A1 * | 11/2006 | Howell | G06F 11/1484 714/21 |
| 2007/0285271 | A1 * | 12/2007 | Erlingsson | G06F 12/1441 340/815.84 |
| 2010/0011209 | A1 | 1/2010 | Kiriansky et al. | |
| 2011/0289586 | A1 | 11/2011 | Kc et al. | |
| 2012/0151184 | A1 * | 6/2012 | Wilkerson | G06F 8/43 712/36 |
| 2012/0255038 | A1 * | 10/2012 | Havercan | G06F 21/52 726/30 |
| 2014/0283088 | A1 | 9/2014 | AlHarbi et al. | |
| 2014/0325650 | A1 * | 10/2014 | Pavlyushchik | G06F 21/566 726/23 |
| 2014/0372734 | A1 * | 12/2014 | Greathouse | G06F 9/3005 712/237 |
| 2015/0067279 | A1 | 3/2015 | Costin | |
| 2016/0180079 | A1 * | 6/2016 | Sahita | G06F 21/554 726/22 |

OTHER PUBLICATIONS

International Search Report and Written Opinion dated May 31, 2017 for International Application No. PCT/US2017/020017, 13 pages.

* cited by examiner

*Primary Examiner* — Daxin Wu
(74) *Attorney, Agent, or Firm* — Schwabe, Williamson & Wyatt, P.C.

(57) ABSTRACT

A copy is made of at least a part a stack. A caller return address of a calling function in the stack is verified as trusted. A caller return address of a called function in the stack is verified as matching a source address of the calling function in the copy of the stack. If verification is affirmative, then the called function may be executed in a trusted domain.

25 Claims, 9 Drawing Sheets

TRUSTED EXECUTION OF CALLED FUNCTION

TECHNICAL FIELD

The present disclosure relates to the field of computing. More particularly, the present disclosure relates to trusted execution of called function, such as enforcing code flow integrity against malware attacks in a computer system which supports virtual machines.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In software, a stack buffer overflow or stack buffer overrun occurs when a function writes to a memory address on the function's call stack outside of an intended data structure—usually a fixed-length buffer or an allocated portion thereof. These can occur accidentally through stack buffer overflow bugs or though deliberate attacks by malware; in the latter case, it is sometimes referred to as "stack smashing". If an untrusted function is able to fill some or all the stack buffer with data, then that function can inject data into the stack and take control of functions executed by the central processing unit; the injected data may be data used by a function (such as parameters, return values, and addresses) or may be executable code.

Protection against stack smashing attacks is not effective when malware can bypass code that verifies stack integrity. Checking the stack to verify that the trusted function is entered from another trusted code is not reliable because malware can manipulate the stack, faking a trusted function's return address using return-oriented programming. In return-oriented programming, attacking malware gains control of the call stack, typically via a buffer overrun, to overwrite a function's variables and/or return address. The overwritten return address may then be used to redirect control flow to the (corrupted) calling subroutine to execute carefully chosen machine instruction sequences called "gadgets". A gadget typically ends in a return instruction and is located in an existing program and/or shared library code. Chained together, gadgets may allow an attacker to perform arbitrary operations. Malware can take advantage of such vulnerabilities by jumping to code branches inside the trusted function after setting the machine state necessary to achieve malicious goals.

Some legacy solutions inject "stack canaries" to detect stack manipulation. A stack canary is typically a small integer with a random value chosen at the start of function execution and placed in the stack before the stack return pointer. Because stack smashing malware sometimes overwrites the return pointer to take control of function execution, the canary value may be overwritten. However, these software-only-solutions cannot detect if the malware manages to modify the stack without a buffer overflow or without overwriting return pointers, thus not modifying the canary words.

BRIEF DESCRIPTION OF THE DRAWINGS

Embodiments of the code flow integrity verification techniques of the present disclosure may overcome the above noted limitations. The technique will be understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
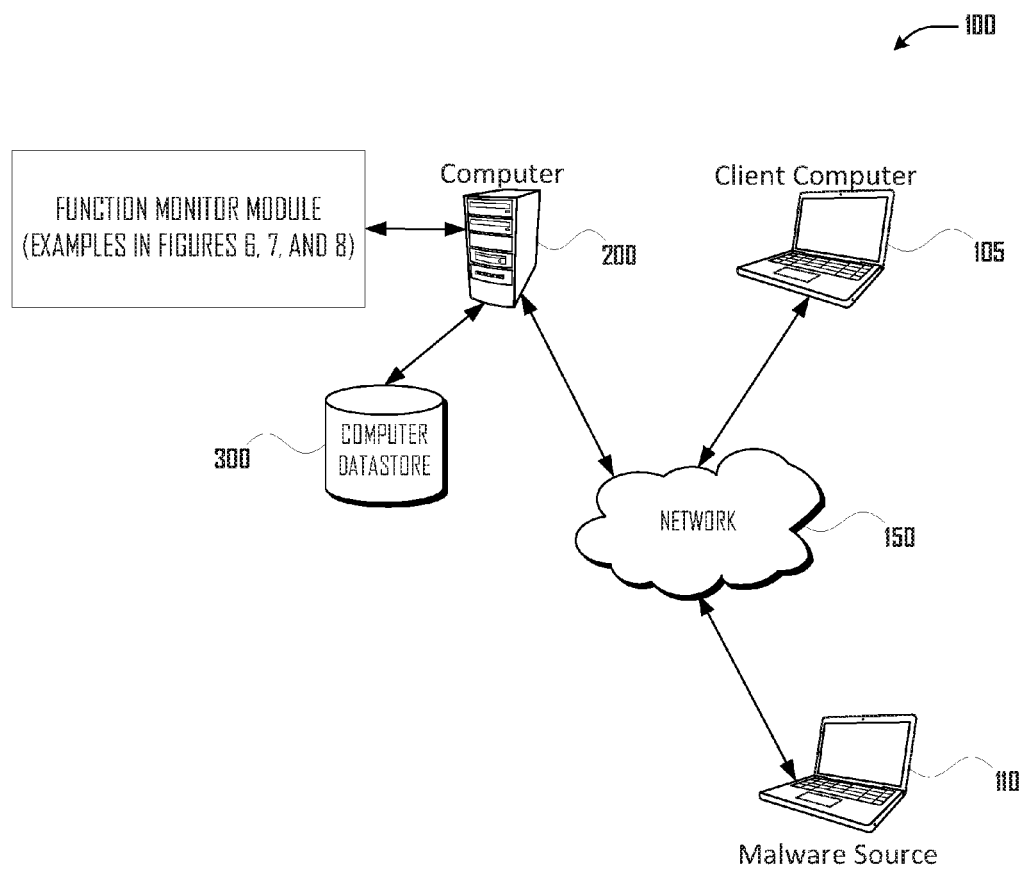
FIG. 1 is a network and device diagram of a computing platform, a network and a malware source, incorporated with the trusted execution of called function technology of the present disclosure, according to some embodiments.

Apparatuses, methods and storage media associated with and/or for trusted execution of called function are described herein. In embodiments, modules in computer hardware and/or software record branches, interrupts, and exceptions; in an embodiment, this service may be provided by a module which copies at least part of a stack—such as branch addresses (comprising source and destination addresses), interrupts, and exceptions—to e.g., Last Branch Records ("LBRs") in Model-Specific Registers ("MSRs") of a processor. Recording to MSRs may be activated by a flag and software, examples of which may include firmware and/or a hardware assisted module with high privileges, an example of which may include System Management Mode ("SMM") in Intel® chips. The MSRs may have 4 to 32 registers, each with, for example, 64 bits, and may be circular (such as first-in, first-out). The branch addresses may be saved in 32 or 64 bit format, as a linear address or as an off-set relative to a source/destination. Another flag may be set to save the branch records in a Branch Trace Store ("BTS") in a larger software-designated debug area of memory ("Debug Store Save Area" or "DS Save Area"). The address data in the copy of the stack (whether in the LBR or BTS) is not generally used as the stack, though it is copied from the stack.

The data in the copy of the stack can be advantageously used to prevent malware which manipulates the stack, including stack manipulations which do not necessarily result in a buffer overflow.

In overview, at, for example, system start of a computer, a whitelist of valid or trusted caller address ranges may be created by, for example, security software. The whitelist may be passed to a hypervisor (such as in a VMCall, which allows guest software to make a service call to a virtual machine monitor or hypervisor) or the whitelist may be otherwise used by a hypervisor to assign address ranges to trusted processes; untrusted processes may be assigned address ranges not in the ranges allocated to trusted processes. In addition, at system start, a stub code may be added to the entry points of trusted functions to invoke the functions ascribed to a Function Monitor Module, (e.g., Function Monitor Module inside VMM 600, Function Monitor Module in Guest OS-1 700, and Function Monitor Module in Guest OS-2 800), to be described more fully below.

Optionally at startup, creating the copy of the stack in the LBR, BTS, or another memory location or resource may be enabled by a Function Branch Recording Module (such as Function Branch Recording Module 500), also to be described more fully below. This function may also or may alternatively be invoked after startup, as described further below.

Creation of the whitelist, insertion of a Monitor Stub Code, and enabling creation of the copy of the stack as described herein may be performed by a Startup Module (such as Startup Module 400) and a Function Branch Recording Module (such as Function Branch Recording Module 500), described more fully below. It should be recognized that the functions described herein as occurring within or being executed by a particular module may be performed independently from a module or may be relocated to another module or to other modules without deviating from the spirit or intention of this disclosure.

After startup, the Function Monitor Module may verify code flow integrity by checking if a caller return address of a calling function in the stack is in the trusted caller address range provided and/or created at system startup. The Function Monitor Module may also compare a caller return address of a function called by the calling function to a source address of the calling function as found in the copy of the stack. If these verification checks are affirmative, then the called function may be allowed to access otherwise protected code and data, such as by switching execution of the function to a trusted domain in an operating system. This may ensure that malware has not compromised integrity of the stack, created Gadgets, or the like.

For example, if a programmer creates a webpage which uses Transport Layer Security to secure communication between a server and a web browser, the programmer may assign handling of credit card or other sensitive information to a trusted function which operates in a trusted domain in the operating system of the web browser or of the server. The disclosed techniques may be used to verify the stack integrity (on either the browser or server side), to make it more difficult for malware to insert a Gadget which could copy the credit card information (or other sensitive data) to a message which is sent to the malware operator.

Embodiments are discussed in which the Function Monitor Module is executed entirely inside a Virtual Machine Monitor ("VMM") or Hypervisor or in which the Function Monitor Module is executed at least in part inside a Guest Operating System/Application or Virtual Machine. As described further herein, when executed at least in part inside a Virtual Machine, additional processes may be implemented to record an interrupt state for the calling function, to turn off or suspend interrupts relative to the calling function pending verification of a function it calls, and to re-set the interrupt state for the calling function after verification of the called function.

In embodiments of the Function Monitor Module, additional processes may be implemented to save the copy of the stack to a BTS if, for example, the required branch records cannot be found in LBR.

In embodiments, an apparatus may include a physical computing platform with one or more physical processors and a virtual machine manager to manage operation of virtual machines.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), a System on a Chip (SoC), an electronic circuit, a processor (shared, dedicated, or group) and/or memory (shared, dedicated, or group) that execute one or more software or firmware programs, a combinational logic circuit, and/or other suitable components that provide the described functionality.

Referring to FIG. 1, illustrated is Computer 200 incorporated with the trusted execution of called function technique of the present disclosure, according to various embodiments. Computer 200 is further illustrated in and described in relation to FIG. 2. In overview, Computer 200 may any computing device incorporating embodiments of the disclosure herein, for example, Computer 200 may be a server, a mobile computer (such as a wearable device, a mobile "smart" phone, a tablet, or laptop computer), a personal computer, a gaming computer, and/or an Internet-enabled television, or similar device. Also illustrated in FIG. 1 is Computer Datastore 300. Computer Datastore 300 is further illustrated in and described in relation to FIGS. 2 and 3.

Also illustrated in FIG. 1 is Client Computer 105. Client Computer 105 may be similar to Computer 200. Client Computer 105 may, for example, be attempting to connect or communicate with Computer 200.

Also illustrated in FIG. 1 is Malware Source 105. Malware Source 105 may be a computer similar to Computer 200 and/or Client Computer 105. Malware Source 105 may attempt to inject malware into Computer 200 and/or Client Computer 105, attempting to compromise a stack in one or both of such other computers in order to obtain information (including sensitive information) and/or to execute arbitrary code.

These components and modules therein may communicate via Network 150. Network 150 may comprise computers, network connections among the computers, networking devices, and software modules to enable communication between the computers over network connections. Network 150 may be used to enable relatively long-range communication or short-range communication (such as, for example, between components within Computer 200 in a local area network). Examples comprise an Ethernet network, the Internet, and/or a wireless network, such as a Wi-Fi, GSM, TDMA, CDMA, EDGE, HSPA, LTE or other network provided with or without a wireless service provider. Connection to Network 150 may be via a wired or a wireless connection, such as a Wi-Fi connection (Network 150 may comprise more than one network component). More than one network may be involved in a communication session between the illustrated devices. Connection to Network 150 may require that the computers execute software modules which enable, for example, the seven layers of the OSI model of computer networking or equivalent in a wireless phone network.

This paper may discuss a first computer as connecting to a second computer (such as Client Computer 105 connecting to Computer 200) or to a corresponding datastore (such as to Computer Datastore 300); it should be understood that such connections may be to, through, or via the other of the two components (for example, a statement that a computing device connects with or sends data to Computer 200 should be understood as saying that the computing device may connect with or send data Computer Datastore 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the modules and data groups used by modules may be stored and/or executed remotely relative to any of the computers through, for example, application virtualization.

Figure 2:
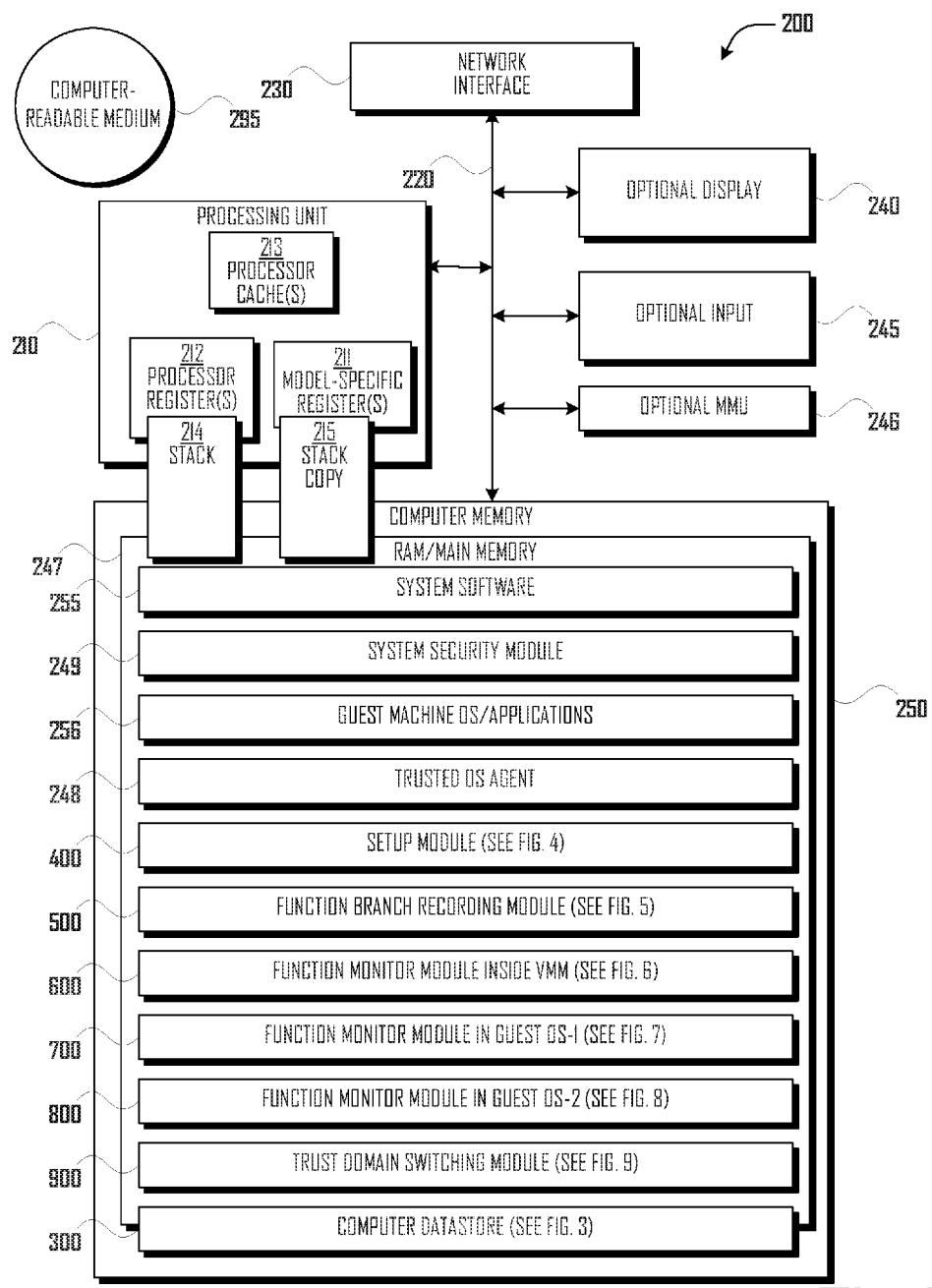
FIG. 2 is a block diagram of a computing platform illustrating examples of modules configured according to embodiments of the present disclosure.

FIG. 2 is an example functional block diagram of an exemplary Computer 200 computing device and some data structures and/or components thereof, according to various embodiments. Computer 200 in FIG. 2 may comprise at least one Processing Unit 210, Computer Memory 250, Optional Display 240, Optional Input 245, and Optional Memory Management Unit ("MMU") 246, which all may be interconnected along with Network Interface 230 via Bus 220 (which may comprise one or more buses with or without bus bridges).

Processing Unit 210 may comprise one or more general-purpose Central Processing Units ("CPU") as well as one or more special-purpose Graphics Processing Units ("GPU"). Processing Unit 210 is illustrated as comprising Model-Specific Register(s) 211, Processor Register(s) 212, and Processor Cache(s) 213.

Also illustrated in FIG. 2 is Stack 214. Stack 214 is illustrated as overlapping Processor Register 212, Computer Memory 250, and RAM/Main Memory 247. This overlap is meant to illustrate that Stack 214 may be implemented in Processor Register 212, Computer Memory 250, and/or RAM/Main Memory 247. An example of Stack 214 is provided in Table 1 (following).

| Stack Frame # | Content note | Address | Notes |
|---|---|---|---|
| N-3 | LOCAL DATA | 27 | Stack Origin |
|  | LOCAL DATA | 26 |  |
|  | Return link to N-3 | 25 |  |
| N-2 | LOCAL DATA | 24 |  |
|  | LOCAL DATA | 23 |  |
|  | LOCAL DATA | 22 |  |
|  | LOCAL DATA | 21 |  |
|  | Return link to N-2 | 20 |  |
| N-1 | LOCAL DATA | 19 |  |
|  | LOCAL DATA | 18 |  |
|  | LOCAL DATA | 17 |  |
|  | Return link to N-1 | 16 |  |
| N (active Frame) | LOCAL DATA | 15 |  |
|  | LOCAL DATA | 14 |  |
|  | LOCAL DATA | 13 |  |
|  | LOCAL DATA | 12 |  |
|  | LOCAL DATA | 11 | ← Stack Pointer points here |
|  | Available | 10 |  |
|  | Available | 9 |  |
|  | Available | 8 |  |
|  | Available | 7 |  |
|  | Available | 6 |  |
|  | Available | 5 |  |
|  | Available | 4 |  |
|  | Available | 3 |  |
|  | Available | 2 |  |
|  | Available | 1 |  |
|  | Available | 0 |  |

Table 1 (above), Stack Example.

Also illustrated in FIG. 2 is Stack Copy 215. Stack Copy 215 is illustrated as overlapping Model-Specific Register 211, Computer Memory 250, and/or RAMIMain Memory 247. This overlap is meant to illustrate that Stack Copy 215 may be implemented (or saved in) in Model-Specific Register 211, Computer Memory 250, and/or RAMIMain Memory 247. Stack Copy 215 may also be implemented in other memory available to Computer 200, such as in Processor Cache 213. Stack 214 and Stack Copy 215 are discussed further herein.

Also illustrated in FIG. 2 is System Software 255. System Software 255 may comprise software which cannot be uninstalled or significantly changed without affecting the functioning of other software. As used herein, System Software 255 may comprise, for example, a virtual machine monitor or hypervisor ("VMM"), device drivers (including BIOS and device firmware), and the like. The VMM may, for example, support Host and Guest Machines via INTEL® virtualization technology, also known as VT-X.

Also illustrated in FIG. 2 is System Security Module 249. System Security Module 249 comprises software which provides, ensures, and/or operates toward a secure computing environment within Computer 200. System Security Module 249 may utilize and/or rely on hardware within Computer 200, such as a secure random number generator, embedded cryptographic keys, identifiers, and the like. System Security Module 249 may be a part of System Software 255. An example of System Security Module 249 is a module that provides support for a "Trusted Execution Environment" ("TEE"), which provides an isolated execution environment with compliant software and hardware. Industry associations, such as GlobalPlatform® and Trusted Computing Group™, support work on TEE and similar projects. The TEE may be any one of a number of hardware and/or software secure execution arrangements to secure and protect the components involved in providing the trusted execution of called functions from tampering by malicious attackers. For example, the TEE may be provided by a dedicated manageability engine (operating in a dedicated core of processing unit 210), using the execution enclave feature provided by the Software Guard Extension (SGX) to the x86 Instruction Set of Intel® x86 processors (when processing unit 210 is an x86 processor that supports SGX), using a secure system management mode feature of processing unit 210 (e.g., System Management Interrupt (SMI) of x86 processors when processing unit 210 is an x86 processor), or using the TrustZone® technology (when processing unit 210 is an ARM® processor).

Also illustrated in FIG. 2 is Trusted OS Agent 248. Trusted OS Agent 248 may be a part of System Software 255, System Security Module 249, and/or Guest Machine OS/Applications 256. Trusted OS Agent 248 is discussed further herein and generally may be understood to assign or report the assignment of memory regions to functions, including those functions which have been assigned trusted or protected memory regions. Guest Machine OS/Applications 256 may refer to operating systems and software applications executed by or under the control of System Software 255 and a hypervisor therein.

System Software 255, System Security Module 249, and/or Trusted OS Agent 248 may limit access by functions to assigned trust or security levels. For example, System Software 255 may have a security level "0", while user applications may have an assigned surety level "3". Functions assigned to less secure levels may be blocked from accessing or even knowing the addresses of memory addresses assigned to secure applications, as may be accomplished using various data structures that describe memory areas, e.g., for X86 processors, the Global Descriptor Table and/or Local Descriptor Tables. Alternatively, functions assigned to less secure levels may be blocked according to a virtual memory address space and/or Extended Page Tables and the like. These techniques prevent relatively insecure applications or functions from even knowing what memory addresses are assigned to more secure applications or functions.

The components of Processing Unit 210, Stack 214 and Stack Copy 215 may be utilized by System Software 255, and by extension thereof, by Guest Machine OS/Applications 256, to execute different functions. Network Interface 230 may be utilized to form connections with Network 150 or to form device-to-device connections with other computers, such as with Computer Datastore 300 (if Computer Datastore 300 is implemented in as computer across a network accessible via Network Interface 230, instead of Bus 220). Computer Memory 250 may generally comprise a random access memory ("RAM"), a read only memory ("ROM"), and a permanent mass storage device, such as a disk drive, SDRAM (synchronous dynamic random-access memory), or SSD (solid state drive), also referred to herein as "main memory". RAM/Main Memory 247 is illustrated separately for the purpose of illustrating memory locations where Stack 214 and Stack Copy 215 may be stored.

Computer Memory 250 may store program code for software routines or modules, such as, for example, Setup Module 400, Function Branch Recording Module 500, Function Monitor Module inside VMM 600, Function Monitor Module in Guest OS-1 700, Function Monitor Module in Guest OS-2 800, and Trust Domain Switching Module 900, as well as, for example, browser, email client and server routines, client applications, and database applications (which may also be part of Guest Machine OS/Applications 256). Function Monitor Module inside VMM 600, Function Monitor Module in Guest OS-1 700, and Function Monitor Module in Guest OS-2 800 may be collectively referred to as Function Monitor Module. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in an application and/or user interface in a computing device (whether in a web browser or in, for example, a mobile device application).

These software components may be loaded from Computer Readable Storage Medium 295 (which may be non-transitory) into Computer Memory 250 of the computing device using a drive mechanism (not shown) associated with non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 495 (e.g., via Network Interface 230, including via transitory media, such as signals).

Computer 200 may also comprise hardware supporting input modalities, Optional Input 245, such as, for example, a touchscreen, a camera, a keyboard, a mouse, a trackball, a stylus, motion detectors, and a microphone. Optional Input 245 may also serve as Optional Display 240, as in the case of a touchscreen display which also serves as Optional Input 245, and which may respond to input in the form of contact by a finger or stylus with the surface of Optional Input 245. Optional Display 240 represents any technology capable of rendering graphics, audio, smells, vibrations, and the like. Additional Input and Display components may be accessed via Network Interface 230.

Figure 3:
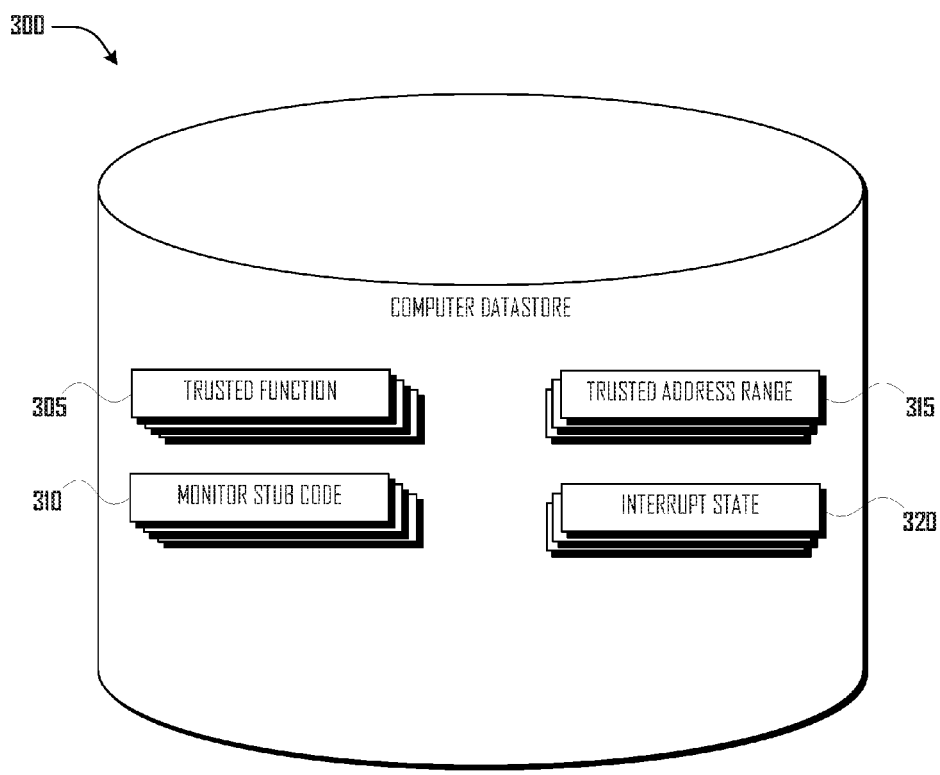
FIG. 3 is a block diagram of a datastore of a computing platform configured according to embodiments of the present disclosure.

Computer 200 may also comprise or communicate via Bus 220 with Computer Datastore 300, illustrated further in FIG. 3. In various embodiments, Bus 220 may comprise a storage area network ("SAN"), a high speed serial bus, and/or via other suitable communication technology. In some embodiments, Computer 200 may communicate with Computer Datastore 300 via Network Interface 230. Computer 200 may, in some embodiments, include many more components than those shown in this Figure. However, it is not necessary that all of these generally conventional components be shown in order to disclose an illustrative embodiment.

FIG. 3 is an example functional block diagram of Computer Datastore 300 illustrated in the computing device of FIG. 2, according to various embodiments. The components 305-399 of Computer Datastore 300 may include data groups used by modules. The data groups used by modules illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

The components 305-399 of Computer Datastore 300 are discussed further herein in the discussion of the remaining Figures.

Figure 4:
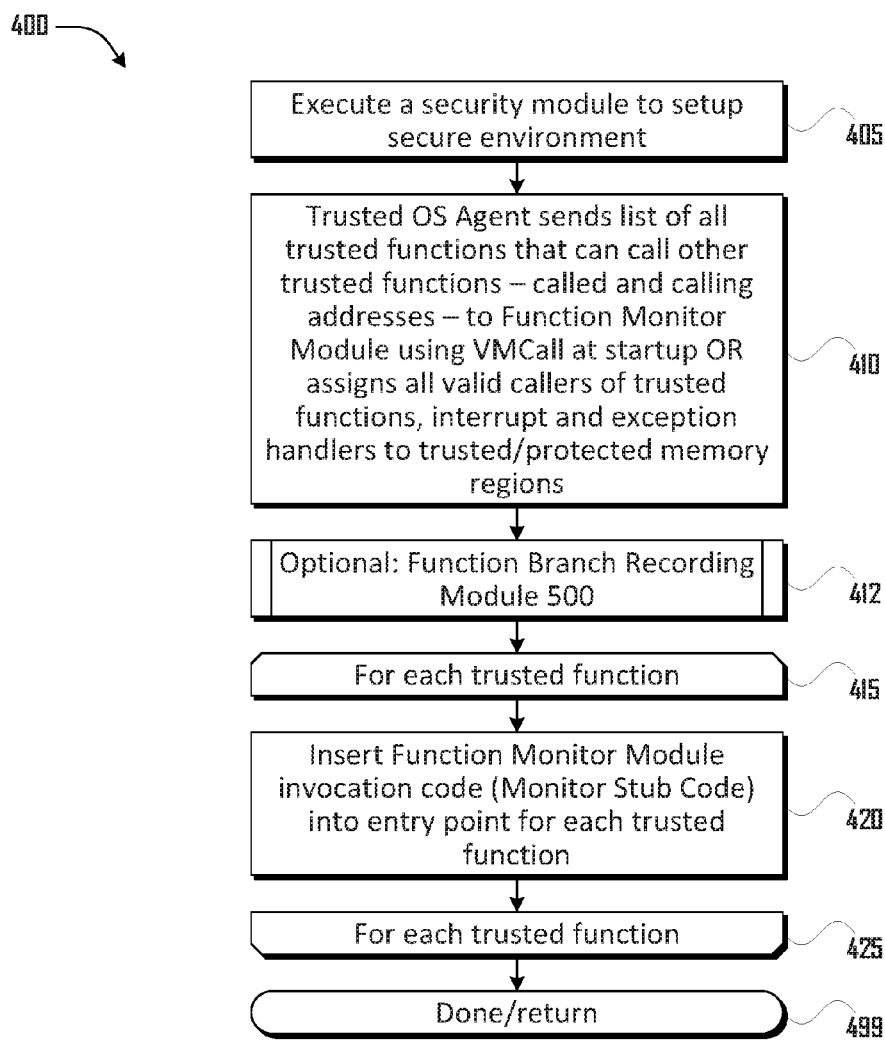
FIG. 4 is a flow diagram illustrating an example of a method practiced by an exemplary setup module (i.e., its algorithmic structure), according to various embodiments.

Referring now to FIG. 4, which illustrates an example of operation flow/algorithmic structure of Setup Module 400, according to various embodiments, is illustrated. Setup Module 400 may be executed by, for example, Computer 200, such as by System Software 255.

At block 405, a security module, such as System Security Module 249, may be executed to setup a secure computing environment within Computer 200. As part of setting up the secure computing environment and/or as a separate process, at block 410, Trusted OS Agent 248 may create a list (or the like) of trusted functions—functions from e.g., a trusted source—that can call other trusted functions. Trusted sources may comprise, for example, operating systems, applications, and/or functions provided by a named party and, for example, wherein the identity of the named party and the functions provided thereby may be cryptographically signed (and confirmed). Trusted sources may also comprise applications or functions installed by a user, potentially following appropriate warnings. Trusted functions may be given higher privileges in the computing environment of Computer 200. At this block, such functions, trusted callers of trusted functions, interrupt and exception handlers may be assigned trusted or protected memory regions in memory in or accessible to Computer 200. At this block, the list and/or the trusted/protected memory regions assigned thereto may be sent or made available to Function Monitor Module. Functions in such list may be referred to herein as one or more Trusted Function 305 record(s), in Computer Datastore 300. A list (or similar) of trusted address ranges may be referred to herein as Trusted Address Range 315 record(s), in Computer Datastore.

At block 412, Setup Module 400 may optionally execute Function Branch Recording Module 500 or similar. Function Branch Recording Module 500 may turn on copying some or all of Stack 214—such as branch addresses (comprising source and destination addresses), interrupts, and exceptions—to e.g., LBRs in MSRs and/or to BTS or another memory resource. Examples regarding how such copying may be turned on are discussed elsewhere, herein. In the case of Function Monitor Module in Guest OS-2 800, Function Branch Recording Module 500 may be initiated by Function Monitor Module in Guest OS-2 800 after activation of Function Monitor Module in Guest OS-2 800, rather than before-hand, as in the case of Function Monitor Module inside VMM 600 and Function Monitor Module in Guest OS-1 700.

Figure 5:
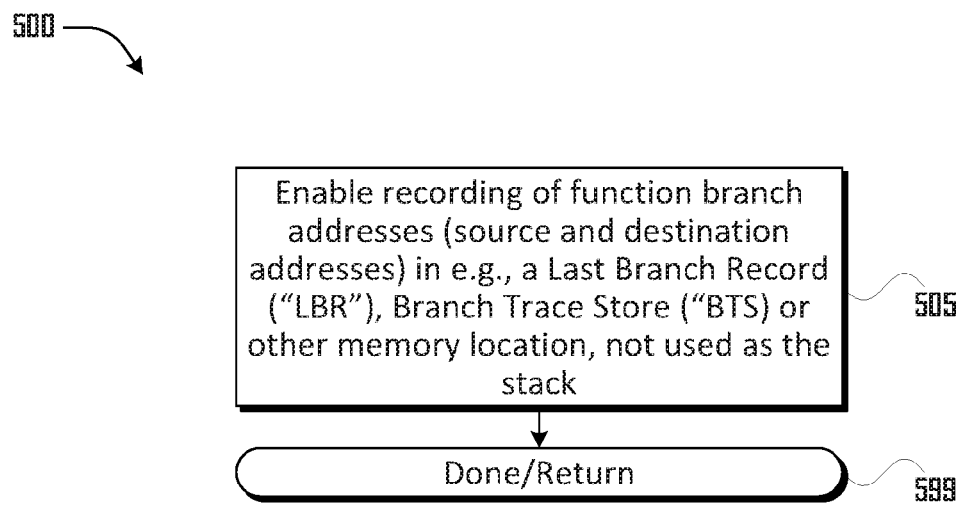
FIG. 5 is a flow diagram illustrating an example of a method practice by an exemplary function branch recording module (i.e., its algorithmic structure), according to various embodiments.

Turning now to FIG. 5, the operation flow/algorithmic structure of Function Branch Recording Module 500, according to various embodiments, is illustrated. Function Branch Recording Module 500 may be executed by, for example Computer 200. Function Branch Recording Module 500 may be executed by another module or may be executed independently.

At block 505, Function Branch Recording Module 500 may enable copying of some or all entries in Stack 214 to e.g., LBR, BTS, or another memory location, identified herein as Stack Copy 215. Generally, Stack Copy 215 is not used as Stack 214, though this may not be a requirement. As discussed above, this copying may be enabled by, for example, setting a bit or flag in a processor equipped to support this function. For example, in Intel® Core™2 Duo and Intel® Atom™ Processor Family an in Intel® Microarchitecture code name "Nehalem", LBR may be enabled by setting bit 0 in an MSR while BTS may be enabeld by setting bit 7 which logs Stack Copy 215 to a memory-resident BTS buffer that is part of the DS Save Area. Use of LBR may have less performance implication than BTS, though LBR may not have as much capacity as BTS.

At block 599, Function Branch Recording Module 500 may conclude and/or return to a process or module which called it.

Returning to FIG. 4, opening loop block 415 to closing loop block 425 may iterate for each trusted function of block 410, such as relative to Trusted Function 305 records. At block 420, Setup Module 400 may insert code to invoke or perform the function of Function Monitor Module, referred to herein as Monitor Stub Code 315 in Computer Datastore 300, into an entry point for each trusted function. The Function Monitor Module may execute, for example, when the trusted function calls another function.

At done block 499, Setup Module 400 may conclude or return to a process or module which called it.

FIG. 5 was discussed above.

Figure 6:
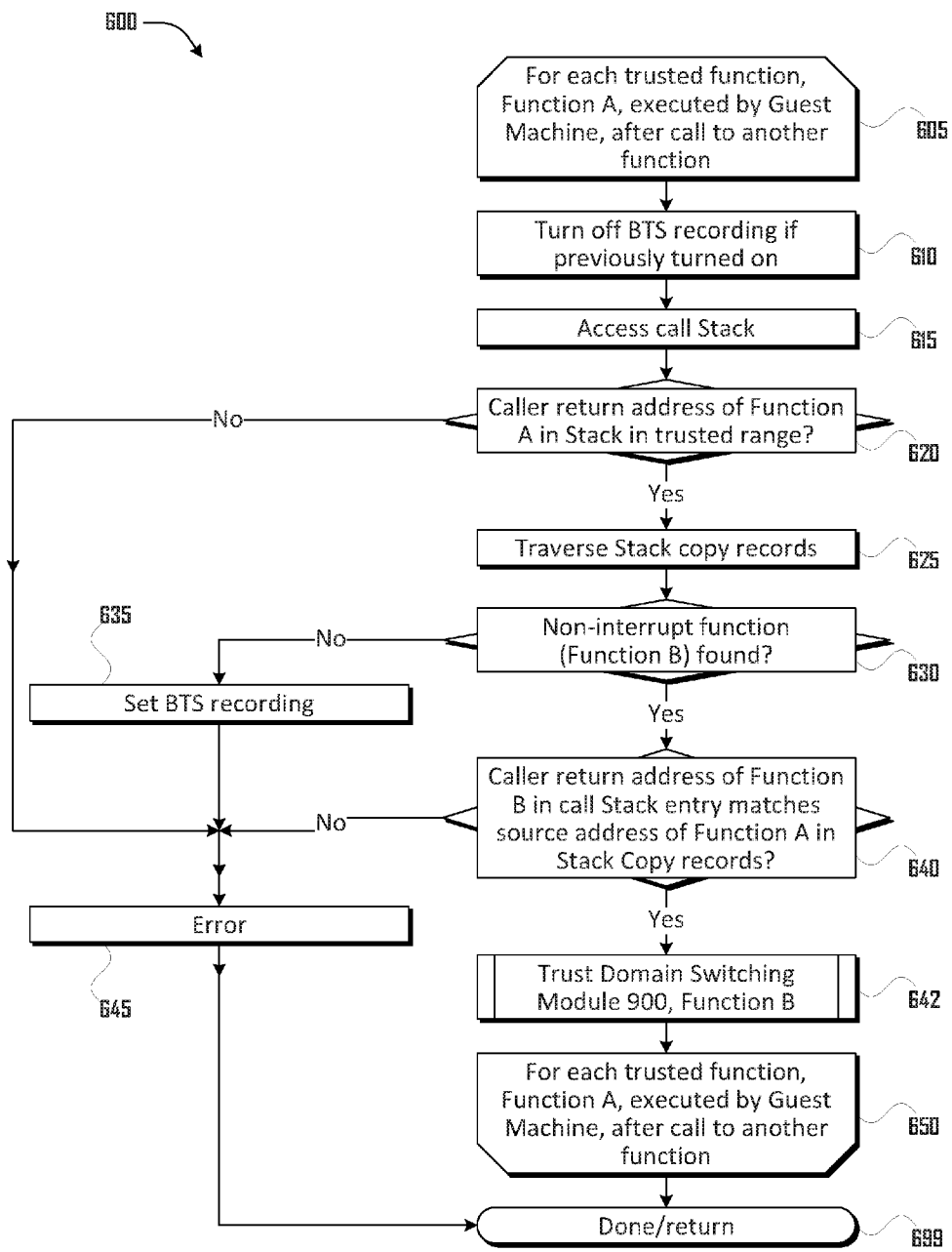
FIG. 6 is a flow diagram illustrating an example of a method practice by an exemplary function monitor module inside a virtual machine monitor for monitoring functions (i.e., its algorithmic structure), according to various embodiments.
Figure 7:
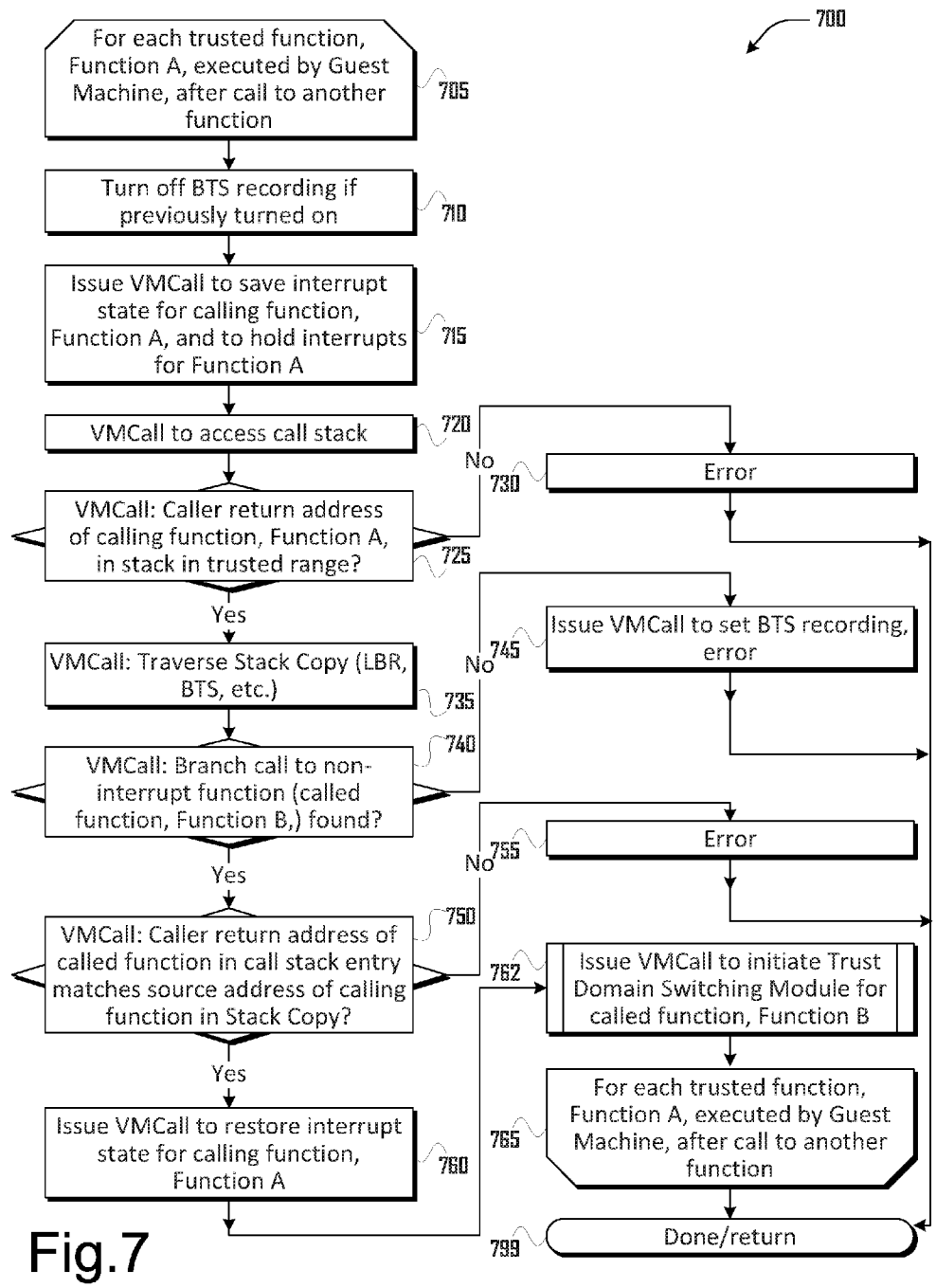
FIG. 7 is a flow diagram illustrating a first example of a method practice by a function monitor module in a guest operating system for monitoring functions (i.e., its algorithmic structure), according to various embodiments.
Figure 8:
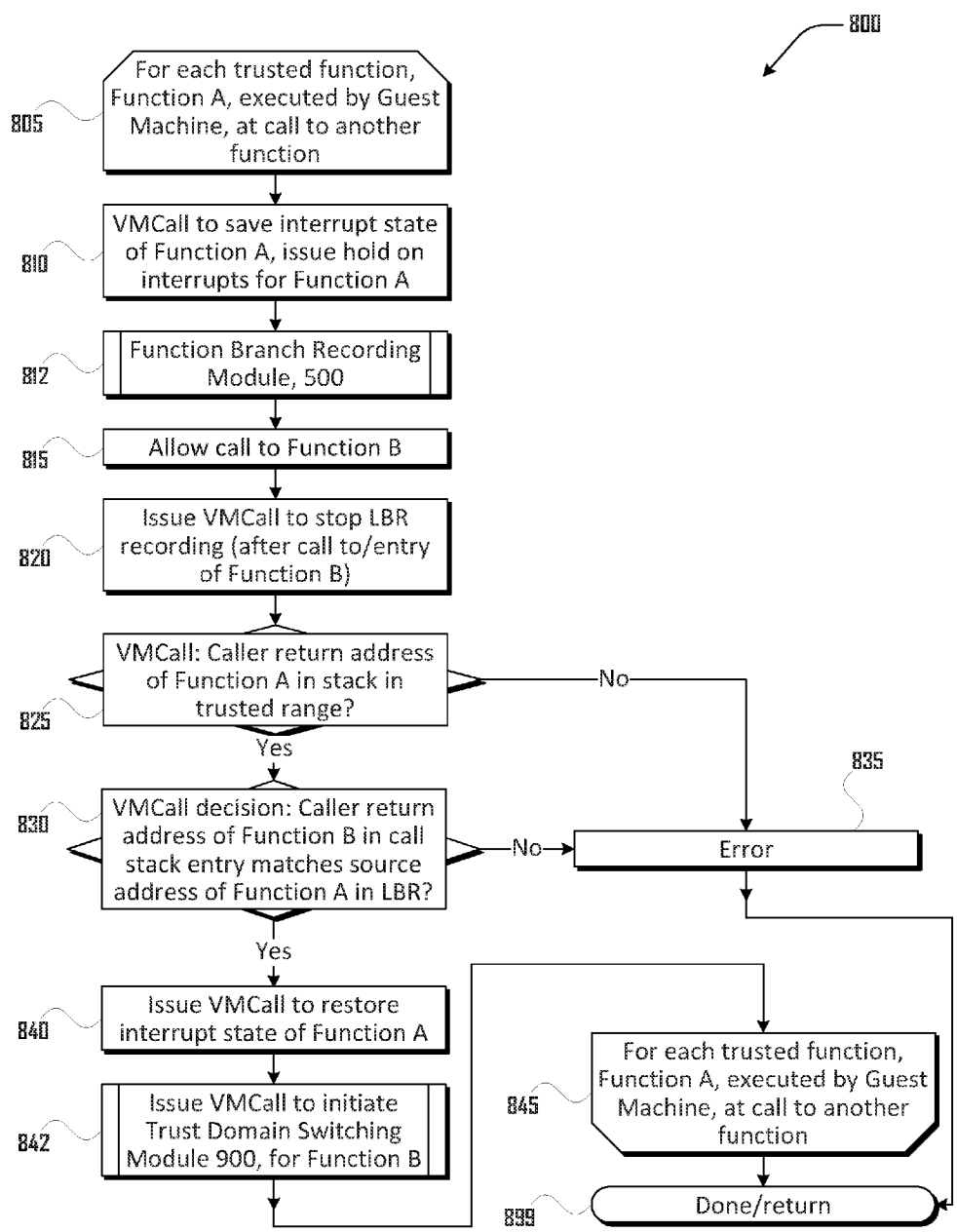
FIG. 8 is a flow diagram illustrating a second example of a method practice by a function monitor module in a guest operating system for monitoring functions (i.e., its algorithmic structure), according to various embodiments.

FIGS. 6 through 8 illustrate example operation flows/algorithmic structures of a Function Monitor Module, according to various embodiments.

FIG. 6 illustrates an example of a Function Monitor Module inside VMM 600. In a VMM or virtual machine monitor, interrupts in or by a Virtual Machine or VM managed by the VMM do not occur, are not processed, are not routed, and/or are delayed. Thus, unlike Function Monitor Module in Guest OS-1 700 and Function Monitor Module in Guest OS-2 800, interrupt handling may occur implicitly, as part of VMM, rather than explicitly, such as via explicit VMCalls made by the VM to the VMM.

Opening loop block 605 to closing loop block 650 may be iterated for each trusted function called by a VM. This function is generally referred to herein as the "calling function" or "Function A". That the calling function, Function A, is trusted may be provided by another function of Computer 200, such as by System Software 255, as may be implemented by the memory utilized by or assigned to Function A. Opening loop block 605 to closing loop block 650 may be iterated for such trusted functions right after such trusted functions call another function, Function B.

At block 610, Function Monitor Module inside VMM 600 may turn off copying Stack 214 to Stack Copy 215 in BTS, if copying to BTS had been turned on in a previous iteration of Function Monitor Module inside VMM 600.

At block 615 Function Monitor Module inside VMM 600 may access the call stack, such as Stack 214.

At decision block 620, Function Monitor Module inside VMM 600 may determine whether a caller return address of Function A Stack 214 is in a trusted range. If negative, then at block 645, Function Monitor Module inside VMM 600 may return an error message to the VM and the function in the VM which invoked Function Monitor Module inside VMM 600.

If affirmative at decision block 620, then at block 625, Function Monitor Module inside VMM 600 may traverse Stack Copy 215 records, such as in LBR or BTS.

At decision block 630, Function Monitor Module inside VMM 600 may determine whether a non-interrupt function has been called (other than the then-current function of opening loop block 605 to closing loop block 650), which non-interrupt function other than the then-current function shall be referred to herein as the "called function" and/or "Function B".

A negative determination at decision block 630 may be because the memory location for Stack Copy 215 is too small; in which case, at block 635, Function Monitor Module inside VMM 600 may turn on BTS recording and may then, at block 645, return an error message to the VM and the function in the VM which invoked Function Monitor Module inside VMM 600. The VM may then call Function A again, at which time BTS recording will be on, which may provide a larger set of Stack Copy 215 records or entries.

If affirmative at decision block 630, at decision block 640, Function Monitor Module inside VMM 600 may determine whether a caller return address of Function B in Stack 214 matches a source address of Function A in Stack Copy 215. There should be a match, because Function B was called by Function A and Function B should return to Function A. If there is not a match, then Stack 214 may have been compromised, such as by malware. This may be performed, for example, by following a Top-of-Stack ("TOS") entry pointing to the LBR.

If negative at decision block 640, then Function Monitor Module inside VMM 600 may, at block 645, return an error message to the VM and the function in the VM which invoked Function Monitor Module inside VMM 600.

If affirmative at decision block 640, then at block 642, Function Monitor Module inside VMM 600 may invoke Trust Domain Switching Module 900 in relation to Function B.

Figure 9:
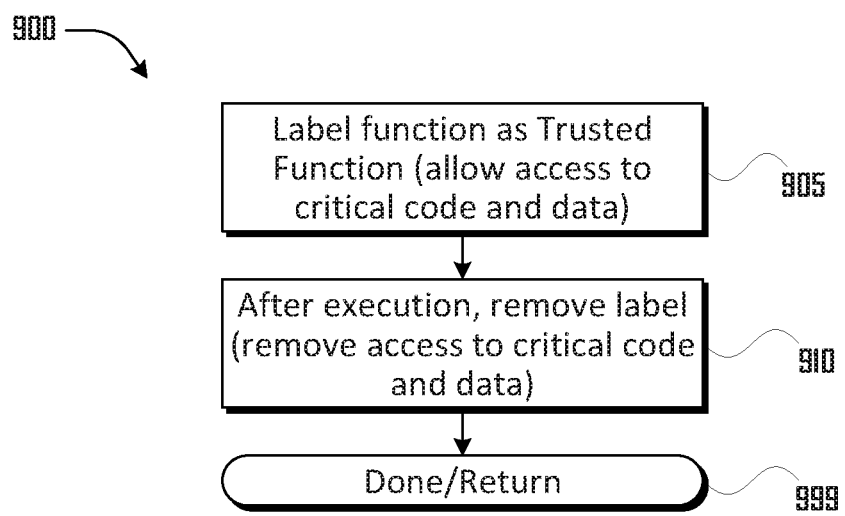
FIG. 9 is a flow diagram illustrating an example of an exemplary trust domain switching module (i.e., its algorithmic structure), according to various embodiments.

Turning to FIG. 9, an example operation flow/algorithmic structure of Trust Domain Switching Module 900, according to some embodiments, is illustrated. Trust Domain Switching Module 900 may be executed by, for example, Computer 200. Trust Domain Switching Module 900 may be invoked by another process or module or may be executed independently.

At block 905 Trust Domain Switching Module 900 may, in relation to the function with respect to which it was invoked, label, flag, or otherwise enable the function as a trusted function, allowing access to code and data which may require trusted privileges. This may be accomplished using a Global Descriptor Table and Local Descriptor Tables and/or according to a virtual memory address space and/or Extended Page Tables and the like.

At block 910, after execution of the then-current function, Trust Domain Switching Module 900 may remove the label, flag, or otherwise disable the called function's access to critical code and data.

At done block 999, Trust Domain Switching Module 900 may conclude and/or return to a process or module which may have invoked it.

FIG. 7 illustrates an example operational flow/algorithmic structure of Function Monitor Module in Guest OS-1 700, according to some embodiments. Function Monitor Module in Guest OS-1 700 may be executed by e.g., a VM executed within Computer 200.

Opening loop block 705 to closing loop block 765 may be iterated for each trusted function executed in or by VM, just after a call by such trusted function to another function. As previously indicated, the trusted function may be confirmed, assigned, or otherwise established as a trusted function by another process, such as during or by Setup Module 400. For ease of understanding, the trusted function shall be referred to as Function A and may also be referred to as the calling function.

At block 710, Function Monitor Module in Guest OS-1 700 may turn off copying Stack 214 to Stack Copy 215 in BTS, if copying to BTS had been turned on in a previous iteration of Function Monitor Module in Guest OS-1 700.

At block 715, Function Monitor Module in Guest OS-1 700 may issue a call to a VMM, such as a VMCall, to save the interrupt state for the calling function, Function A, and to disable, suspend, re-route, or otherwise hold maskable and non-maskable interrupts for Function A. For example, this can be accomplished by a VMCall, which VMCall may cause the VMM to set, for example, a bit or a flag in a control register, such as, the IF bit in the FLAGs register of the Guest virtualized CPU registers, in the case of X86 processors. Holding interrupts may, for example, serve to prevent Stack 214 from being filed by extraneous events, pending performance of the verifications performed by the Function Monitor Module. The interrupt state may be saved in, for example, an Interrupt State 320 record in Computer Datastore 300.

At block 720, Function Monitor Module in Guest OS-1 700 may issue a VMCall to access the call stack, such as Stack 214. At decision block 725, Function Monitor Module in Guest OS-1 700 may issue a VMCall to determine whether a caller return address of the calling function, Function A, in Stack 214 is in a trusted range. If it is not, then at block 730, Function Monitor Module in Guest OS-1 700 may return an error message to Function A in the VM.

If affirmative at decision block 725, Function Monitor Module in Guest OS-1 700 may, at block 735, issue a VMCall to traverse Stack Copy 215, such as in an LBR or BTS. At decision block 740, Function Monitor Module in Guest OS-1 700 may issue a VMCall to determine whether a branch call to Function B is found in Stack Copy 215.

Decision block 740 may be negative if, for example, Stack Copy 215 does not contain enough memory to store sufficient records to include such a branch call. If negative at decision block, Function Monitor Module in Guest OS-1 700 may at block 745, issue a VMCall to the VMM to set BTS recording, which may provide additional memory for Stack Copy 215. Block 745 may also return an error to Function A, which may prompt Function A to call Function B again.

If affirmative at decision block 740, Function Monitor Module in Guest OS-1 700 may, at decision block 750, issue a VMCall to determine whether a caller return address of the called function, Function B, in call Stack 214, matches a source address of the calling function, Function A, in Stack Copy 215. This may be performed, for example, by following a TOS entry pointing to the LBR. A match may not be found if Stack 214 had been manipulated by malware.

If negative at decision block 750, Function Monitor Module in Guest OS-1 700 may, at block 755, return an error message to Function A.

If affirmative at decision block 750, Function Monitor Module in Guest OS-1 700 may, at block 760 issue a VMCall to restore the interrupt state for the calling function, Function A, such as by reference to Interrupt State 320 record of block 715.

At block 762, Function Monitor Module in Guest OS-1 700 may issue a VMCall to initiate Trust Domain Switching Module 900 (discussed elsewhere) to give Function B access to critical code and data and, at conclusion of execution of Function B, such label or access may be removed or disabled.

At done block 799, Function Monitor Module in Guest OS-1 700 may conclude and/or return to a process or module which may have spawned it.

FIG. 8 illustrates an example operation flow/algorithmic structure of Function Monitor Module in Guest OS-2 800, according to various embodiments. As with Function Monitor Module in Guest OS-1 700, Function Monitor Module in Guest OS-2 800 may be executed by or inside a VM executed within Computer 200.

Opening loop block 805 to closing loop block 845 may be iterated for each trusted function executed in or by VM, just after a call by such trusted function, to another function. As previously indicated, the trusted function may be confirmed, assigned, or otherwise established as a trusted function by another process, such as during or by Setup Module 400. For the sake of convenience, the trusted function shall be referred to as Function A and may also be referred to as the calling function.

At block 810, Function Monitor Module in Guest OS-2 800 may issue a call to a VMM, such as a VMCall, to save the interrupt state for the calling function, Function A, and to disable, suspend, re-route, or otherwise hold maskable and non-maskable interrupts for Function A. For example, this can be accomplished by a VMCall, which VMCall may cause the VMM to set an IF bit in the FLAGs register of the Guest virtualized CPU registers. Holding interrupts may, for example, serve to prevent Stack 214 from being filed by extraneous events, pending performance of the verifications performed by the Function Monitor Module. The interrupt state may be saved in, for example, an Interrupt State 320 record in Computer Datastore 300.

At block 812, Function Monitor Module in Guest OS-2 800 may execute earlier described Function Branch Recording Module 500, to turn on creation of Stack Copy 215. This may be accomplished via a VMCall.

At block 815, Function Monitor Module in Guest OS-2 800 may allow the call to Function B to occur.

At block 820, right at entry of Function B, Function Monitor Module in Guest OS-2 800 may issue a VMCall to stop LBR recording or other creation of Stack Copy 215. This may be required to prevent Stack 214 from being filled with extraneous events.

At decision block 825, Function Monitor Module in Guest OS-2 800 may issue a VMCall to access the call stack, such as Stack 214, and determine whether a caller return address of Function A is in a trusted range. If it is not, then at block 835, Function Monitor Module in Guest OS-2 800 may return an error message to Function A in the VM.

At decision block 830, Function Monitor Module in Guest OS-2 800 may issue a VMCall to determine whether a caller return address of the called function, Function B, in call Stack 214, matches a source address of the calling function, Function A, in Stack Copy 215. A match may not be found if Stack 214 had been manipulated by malware. This may be performed, for example, by following a TOS entry pointing to the LBR. If negative at decision block 830, Function Monitor Module in Guest OS-2 800 may, at block 835, return an error message to Function A.

If affirmative at decision block 830, at block 840 Function Monitor Module in Guest OS-2 800 may issue a VMCall to restore the interrupt state for the calling function, Function A, such as by reference to Interrupt State 320 record of block 715.

At block 842, Function Monitor Module in Guest OS-2 800 may issue a VMCall to initiate Trust Domain Switching Module 900 (discussed elsewhere) to give Function B access to protected code and data and, at conclusion of execution of Function B, such label or access may be removed or disabled.

At block 899, Function Monitor Module in Guest OS-2 800 may conclude and/or return to a process or module which may have spawned it.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as Computer 200, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1

An apparatus for computing, comprising: a computer processor and a memory coupled with the computer processor; a function branch recording module, a function monitor module, and a trust domain switching module, which modules are to be loaded into the memory to be operated by the computer processor; wherein the function branch recording module is to make a copy of at least a part a stack ("copy of at least part of the stack"); wherein the function monitor module is to verify that a caller return address of a calling function in the stack is trusted and that a caller return address of a called function in the stack matches a source address of the calling function in the copy of at least part of the stack; and, following such verification, wherein, the trust domain switching module is to switch execution of the called function to a trusted domain.

Example 2

The apparatus according to Example 1, wherein the copy of at least part of the stack is made to a Last Branch Record ("LBR") in a Model-Specific Register ("MSR") of the computer processor.

Example 3

The apparatus according to Example 2, wherein to verify that the caller return address of the called function in the stack matches the source address of the calling function in the copy of at least part of the stack comprises to follow a TOS entry pointing to the LBR and to determine that the source address of the calling function in the LBR matches the caller return address of the called function in the stack.

Example 4

The apparatus according to Example 3, wherein the function monitor module is further to save an interrupt state for the calling function and is to hold interrupts for the calling function pending verification that the caller return address of the calling function in the stack is trusted and that the caller return address of the called function in the stack matches the source address of the calling function in the copy of at least part of the stack and is to restore the saved interrupt state for the calling function after switching execution of the called function to the trusted domain.

Example 5

The apparatus according to Example 1, wherein the function monitor module is further to traverse the copy of at least part of the stack, determine that the called function is not found in the copy of at least part of the stack, turn on a Branch Trace Store ("BTS") to store as the copy of at least part of the stack, and return an error to the calling function.

Example 6

The apparatus according to Example 1, wherein the function monitor module is further to make a virtual machine call to a hypervisor to stop recording the copy of at least part of the stack before the function monitor module is to verify that the caller return address of the calling function in the stack is trusted and that the caller return address of the called function in the stack matches the source address of the calling function in the copy of at least part of the stack.

Example 7

The apparatus according to Example 1, further comprising a virtual machine monitor to be operated by the computer processor, wherein the virtual machine monitor comprises the function monitor module.

Example 8

The apparatus according to Example 1, further comprising a virtual machine to be operated by the computer processor, wherein a setup module is to insert into an entry point for the calling function in the virtual machine a stub code comprising the function monitor module.

Example 9

The apparatus according to Example 8, wherein the calling function and the called function are functions of the virtual machine.

Example 10

The apparatus according to Example 8, wherein the function monitor module is further to implement at least part of the function branch recording module and the function monitor module by making one or more calls to a virtual machine monitor.

Example 11

The apparatus according to any one of Example 1 to Example 10, wherein to verify that the caller return address of the calling function in the stack is trusted comprises to check a trusted caller return address provided by a trusted agent of a system software of the apparatus.

Example 12

The apparatus according to any one of Example 1 to Example 10, wherein upon completion of an execution of the called function, the trust domain switching module is further to switch execution of the called function to an untrusted domain.

Example 13

A computer implemented method for computing comprising: making a copy of at least a part of a stack ("copy of at least part of the stack") in a; verifying that a caller return address of a calling function in the stack is trusted and that a caller return address of a called function in the stack matches a source address of the calling function in the copy of at least part of the stack; and, following such verification, switching execution of the called function by a computer processor to a trusted domain.

Example 14

The method according to Example 13, wherein the copy of at least part of the stack is in a Last Branch Record ("LBR") in a Model-Specific Register ("MSR") of the computer processor.

Example 15

The method according to Example 14, wherein verifying that the caller return address of the called function in the stack matches the source address of the calling function in the copy of at least part of the stack comprises following a TOS entry pointing to the LBR and to determine that the source address of the calling function in the LBR matches the caller return address of the called function in the stack.

Example 16

The method according to Example 15, further comprising saving an interrupt state for the calling function and holding interrupts for the calling function pending verification that the caller return address of the calling function in the stack is trusted and that the caller return address of the called function in the stack matches the source address of the calling function in the copy of at least part of the stack, and restoring the saved interrupt state for the calling function after switching execution of the called function to the trusted domain.

Example 17

The method according to Example 13, further comprising traversing the copy of at least part of the stack, determining that the called function is not found in the copy of at least part of the stack, turning on a Branch Trace Store ("BTS") to store the copy of at least part of the stack, and returning an error to the calling function.

Example 18

The method according to Example 13, further comprising making a virtual machine call to a hypervisor to stop recording the stack in the copy of at least part of the stack before verifying that the caller return address of the calling function in the stack is trusted and that the caller return address of the called function in the stack matches the source address of the calling function in the copy of at least part of the stack.

Example 19

The method according to Example 13, wherein a virtual machine monitor verifies that the caller return address of the calling function in the stack is trusted and that the caller return address of the called function in the stack matches the source address of the calling function in the copy of at least part of the stack.

Example 20

The method according to Example 13, further comprising inserting into an entry point for the calling function in the virtual machine a stub code for verifying that the caller return address of the calling function in the stack is trusted and that the caller return address of the called function in the stack matches the source address of the calling function in the copy of at least part of the stack.

Example 21

The method according to Example 20, wherein the calling function and the called function are functions of the virtual machine.

Example 22

The method according to Example 20, further comprising making a call to virtual machine monitor to verify that the caller return address of the calling function in the stack is trusted and that the caller return address of the called function in the stack matches the source address of the calling function in the copy of at least part of the stack.

Example 23

The method according to any one of Example 13 to Example 22, wherein verifying that the caller return address of the calling function in the stack is trusted comprises checking a trusted caller return address provided by a trusted agent of a system software coupled to the computer processor.

Example 24

The method according to any one of Example 13 to Example 23, further comprising, after completion of an execution of the called function by the computer processor in the trusted domain, switching the called function to an untrusted domain.

Example 25

An computing apparatus comprising: means to make a copy of at least a part of a stack ("copy of at least part of the stack"); means to verify that a caller return address of a calling function in the stack is trusted and that a caller return address of a called function in the stack matches a source address of the calling function in the copy of at least part of the stack; and, following such verification, means to switch execution of the called function to a trusted domain.

Example 26

The apparatus according to Example 25, wherein the copy of at least part of the stack is made in a Last Branch Record ("LBR") in a Model-Specific Register ("MSR") of the computing apparatus comprising.

Example 27

The apparatus according to Example 26, wherein means to verify that the caller return address of the called function in the stack matches the source address of the calling function in the copy of at least part of the stack comprises means to follow a Top-of-Stack ("TOS") entry pointing to the LBR and to determine that the source address of the calling function in the LBR matches the caller return address of the called function in the stack.

Example 28

The apparatus according to Example 27, further comprising means to save an interrupt state for the calling function, means to hold interrupts for the calling function pending verification that the caller return address of the calling function in the stack is trusted and that the caller return address of the called function in the stack matches the source address of the calling function in the copy of at least part of the stack, and means to restore the saved interrupt state for the calling function after switching execution of the called function to the trusted domain.

Example 29

The apparatus according to Example 25, further comprising means to traverse the copy of at least part of the stack, determine that the called function is not found in the copy of at least part of the stack, turn on a Branch Trace Store ("BTS") to store as the copy of at least part of the stack, and return an error to the calling function.

Example 30

The apparatus according to Example 25, further comprising means to make a virtual machine call to a hypervisor to stop recording the stack in the copy of at least part of the stack before verifying that the caller return address of the calling function in the stack is trusted and that the caller return address of the called function in the stack matches the source address of the calling function in the copy of at least part of the stack.

Example 31

The apparatus according to Example 25, wherein means to verify that the caller return address of the calling function in the stack is trusted and that the caller return address of the called function in the stack matches the source address of the calling function in the copy of at least part of the stack comprise means for a virtual machine monitor.

Example 32

The apparatus according to Example 25, further comprising means to insert into an entry point for the calling function in a virtual machine a stub code comprising means to verify that the caller return address of the calling function in the stack is trusted and that the caller return address of the called function in the stack matches the source address of the calling function in the copy of at least part of the stack.

Example 33

The apparatus according to Example 32, wherein the calling function and the called function are functions of the virtual machine.

Example 34

The apparatus according to Example 32, wherein means to record the stack in the copy of at least part of the stack and means to verify that the caller return address of the calling function in the stack is trusted and that the caller return address of the called function in the stack matches the source address of the calling function in the copy of at least part of the stack comprise means to make one or more calls to a virtual machine monitor.

Example 35

The apparatus according to any one of Example 25 to Example 34, wherein means to verify that the caller return address of the calling function in the stack is trusted comprises means to check a trusted caller return address provided by a trusted agent of a system software of the apparatus.

Example 36

The apparatus according to any one of Example 25 to Example 34, further comprising means to, upon completion of an execution of the called function, switch execution of the called function to an untrusted domain.

Example 37

One or more computer-readable media comprising instructions that cause a computing device, in response to execution of the instructions by one or more processors of the computing device, to: make a copy of at least a part of a stack ("copy of at least part of the stack"); verify that a caller return address of a calling function in the stack is trusted and that a caller return address of a called function in the stack matches a source address of the calling function in the copy of at least part of the stack; and, following such verification, switch execution of the called function to a trusted domain.

Example 38

The computer-readable media according to Example 37, wherein the copy of at least part of the stack is made in a Last Branch Record ("LBR") in a Model-Specific Register ("MSR") of the one or more processors of the computing device.

Example 39

The computer-readable media according to Example 38, wherein verify that the caller return address of the called function in the stack matches the source address of the calling function in the copy of at least part of the stack comprises follow a Top-of-Stack ("TOS") entry pointing to the LBR and to determine that the source address of the calling function in the LBR matches the caller return address of the called function in the stack.

Example 40

The computer-readable media according to Example 39, further comprising save an interrupt state for the calling function, hold interrupts for the calling function pending verification that the caller return address of the calling function in the stack is trusted and that the caller return address of the called function in the stack matches the source address of the calling function in the copy of at least part of the stack, and restore the saved interrupt state for the calling function after switching execution of the called function to the trusted domain.

Example 41

The computer-readable media according to Example 37, further comprising traverse the copy of at least part of the stack, determine that the called function is not found in the copy of at least part of the stack, turn on a Branch Trace Store ("BTS") to store the copy of at least part of the stack, and return an error to the calling function.

Example 42

The computer-readable media according to Example 37, further comprising make a virtual machine call to a hypervisor to stop recording the stack in the copy of at least part of the stack before verifying that the caller return address of the calling function in the stack is trusted and that the caller return address of the called function in the stack matches the source address of the calling function in the copy of at least part of the stack.

Example 43

The computer-readable media according to Example 37, further comprising a virtual machine monitor to verify that the caller return address of the calling function in the stack is trusted and that the caller return address of the called function in the stack matches the source address of the calling function in the copy of at least part of the stack.

Example 44

The computer-readable media according to Example 37, further comprising to insert into an entry point for the calling function in a virtual machine a stub code, which stub code is to verify that the caller return address of the calling function in the stack is trusted and that the caller return address of the called function in the stack matches the source address of the calling function in the copy of at least part of the stack.

Example 45

The computer-readable media according to Example 44, wherein the calling function and the called function are functions of the virtual machine.

Example 46

The computer-readable media according to Example 44, further comprising make one or more calls to a virtual machine monitor to record the stack in the copy of at least part of the stack and to verify that the caller return address of the calling function in the stack is trusted and that the caller return address of the called function in the stack matches the source address of the calling function in the copy of at least part of the stack.

Example 47

The computer-readable media according to any one of Example 37 to Example 46, wherein to verify that the caller return address of the calling function in the stack is trusted comprises to check a trusted caller return address provided by a trusted agent of a system software coupled to the computing device.

Example 48

The computer-readable media according to any one of Example 37 to Example 46, further comprising, upon completion of an execution of the called function, switch execution of the called function to an untrusted domain.

What is claimed is:

1. An apparatus for computing, comprising:
   a computer processor and a memory coupled with the computer processor;
   a function branch recording module, a function monitor module, and a trust domain switching module, which modules are to be loaded into the memory to be operated by the computer processor;
   wherein the function branch recording module is to make a copy of at least a part of a stack to a branch record in a control register of the computer processor;
   wherein the function monitor module is to verify that a caller return address of a calling function in the stack is trusted and that a caller return address of a called function in the stack matches a source address of the calling function in the copy of at least part of the stack, wherein to verify that the caller return address of the called function in the stack matches the source address of the calling function in the copy of at least part of the stack comprises to follow an entry pointing to the branch record to determine that the source address of the calling function in the branch record matches the caller return address of the called function in the stack; and,
   wherein the trust domain switching module is to switch execution of the called function to a trusted domain following the verification.

2. The apparatus according to claim 1, wherein the control register is a Model-Specific Register ("MSR") of the computer processor and wherein the branch record is a Last Branch Record ("LBR") in the MSR.

3. The apparatus according to claim 2, wherein the entry pointing to the branch is a Top-of-Stack ("TOS") entry pointing to the LBR.

4. The apparatus according to claim 1, wherein the function monitor module is further to save an interrupt state for the calling function and is to hold interrupts for the calling function pending verification that the caller return address of the calling function in the stack is trusted and is to restore the saved interrupt state for the calling function after switching execution of the called function to the trusted domain.

5. The apparatus according to claim 1, wherein the function monitor module is further to make a virtual machine call to a hypervisor to stop recording the copy of at least part of the stack before the function monitor module is to verify that the caller return address of the calling function in the stack is trusted.

6. The apparatus according to claim 1, further comprising a virtual machine monitor and a virtual machine to be operated by the computer processor, wherein the virtual machine monitor and/or the virtual machine comprises the function monitor module and wherein a setup module is to insert into an entry point for the calling function in the virtual machine a stub code comprising the function monitor module.

7. A computer implemented method for computing comprising:
    making a copy of at least a part of a stack ("copy of at least part of the stack") to a branch record in a control register of a computer processor;
    verifying that a caller return address of a calling function in the stack is trusted and that a caller return address of a called function in the stack matches a source address of the calling function in the copy of at least part of the stack, wherein verifying that the caller return address of the called function in the stack matches the source address of the calling function in the copy of at least part of the stack comprises following an entry pointing to the branch record and determining that the source address of the calling function in the branch record matches the caller return address of the called function in the stack; and, following such verification,
    switching execution of the called function by a computer processor to a trusted domain.

8. The method according to claim 7, wherein the control register is a Model-Specific Register ("MSR") of the computer processor and wherein the branch record is a Last Branch Record ("LBR") in the MSR.

9. The method according to claim 8, wherein the entry pointing to the branch is a top of stack ("TOS") entry pointing to the LBR.

10. The method according to claim 7, further comprising saving an interrupt state for the calling function and holding interrupts for the calling function pending verification that the caller return address of the calling function in the stack is trusted, and restoring the saved interrupt state for the calling function after switching execution of the called function to the trusted domain.

11. The method according to claim 7, further comprising making a virtual machine call to a hypervisor to stop recording the stack in the copy of at least part of the stack before verifying that the caller return address of the calling function in the stack is trusted.

12. The method according to claim 7, further comprising inserting into an entry point for the calling function in a virtual machine a stub code for verifying that the caller return address of the calling function in the stack is trusted and that the caller return address of the called function in the stack matches the source address of the calling function in the copy of at least part of the stack.

13. A computing apparatus comprising:
    a computer processor;
    means, including instructions operated by the computer processor, to make a copy of at least a part of a stack to a branch record in a control register of the computing apparatus;
    means, including instructions operated by the computer processor, to verify that a caller return address of a calling function in the stack is trusted and that a caller return address of a called function in the stack matches a source address of the calling function in the copy of at least part of the stack, wherein means to verify that the caller return address of the called function in the stack matches the source address of the calling function in the copy of at least part of the stack comprises means to follow an entry pointing to the branch record and means to determine that the source address of the calling function in the branch record matches the caller return address of the called function in the stack; and
    means, including instructions operated by the computer processor, to switch execution of the called function to a trusted domain following such verification.

14. The apparatus according to claim 13, wherein the control register is a Model-Specific Register ("MSR") of the computing apparatus and wherein the branch record is a Last Branch Record ("LBR") in the MSR.

15. The apparatus according to claim 14, wherein the entry pointing to the branch is a top of stack ("TOS") entry pointing to the LBR.

16. The apparatus according to claim 13, further comprising means, including instructions operated by the computer processor, to save an interrupt state for the calling function, means to hold interrupts for the calling function pending verification that the caller return address of the calling function in the stack is trusted, and means to restore the saved interrupt state for the calling function after switching execution of the called function to the trusted domain.

17. The apparatus according to claim 13, further comprising means, including instructions operated by the computer processor, to make a virtual machine call to a hypervisor to stop recording the stack in the copy of at least part of the stack before verifying that the caller return address of the calling function in the stack is trusted.

18. The apparatus according to claim 13, wherein means, including instructions operated by the computer processor, to verify that the caller return address of the calling function in the stack is trusted and that the caller return address of the called function in the stack matches the source address of the calling function in the copy of at least part of the stack comprise means for a virtual machine monitor.

19. The apparatus according to claim 13, further comprising means, including instructions operated by the computer processor, to insert into an entry point for the calling function in a virtual machine a stub code comprising means to verify that the caller return address of the calling function in the stack is trusted.

20. One or more non-transitory computer-readable media comprising instructions that cause a computing device, in response to execution of the instructions by one or more processors of the computing device, to:
    make a copy of at least a part of a stack ("copy of at least part of the stack") to a branch record in a control record of the one or more processors of the computing device;
    verify that a caller return address of a calling function in the stack is trusted and that a caller return address of a called function in the stack matches a source address of the calling function in the copy of at least part of the stack, wherein verify that the caller return address of the called function in the stack matches the source address of the calling function in the copy of at least part of the stack comprises follow an entry pointing to the branch record and determine that the source address of the calling function in the branch record matches the caller return address of the called function in the stack; and, following such verification,
    switch execution of the called function to a trusted domain.

21. The non-transitory computer-readable media according to claim 20, wherein a control register is a Model-Specific Register ("MSR") of the one or more processors of the computing device and wherein the branch record is a Last Branch Record ("LBR") in the MSR.

22. The non-transitory computer-readable media according to claim 21, wherein the entry pointing to the branch is a top of stack ("TOS") entry pointing to the LBR.

23. The non-transitory computer-readable media according to claim 20, further comprising save an interrupt state for the calling function, hold interrupts for the calling function pending verification that the caller return address of the calling function in the stack is trusted, and restore the saved interrupt state for the calling function after switching execution of the called function to the trusted domain.

24. The non-transitory computer-readable media according to claim 20, further comprising make a virtual machine call to a hypervisor to stop recording the stack in the copy of at least part of the stack before verifying that the caller return address of the calling function in the stack is trusted.

25. The non-transitory computer-readable media according to claim 20, further comprising to insert into an entry point for the calling function in a virtual machine a stub code, which stub code is to verify that the caller return address of the calling function in the stack is trusted and that the caller return address of the called function in the stack matches the source address of the calling function in the copy of at least part of the stack.

* * * * *